United States Patent
Culca et al.

(10) Patent No.: US 6,697,686 B1
(45) Date of Patent: Feb. 24, 2004

(54) CIRCUIT CONFIGURATION AND METHOD FOR STORAGE MANAGEMENT AND EXECUTION OF USER PROGRAMS IN A SMALL CONTROL UNIT

(75) Inventors: Horea-Stefan Culca, Siegburg (DE); Wolfram Kress, Siegburg (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/463,684
(22) PCT Filed: Jul. 8, 1998
(86) PCT No.: PCT/DE98/01879
§ 371 (c)(1), (2), (4) Date: Jan. 28, 2000
(87) PCT Pub. No.: WO99/06895
PCT Pub. Date: Feb. 11, 1999

(30) Foreign Application Priority Data

Jul. 28, 1997 (DE) .......................................... 197 32 324

(51) Int. Cl.$^7$ .............................................. G05B 15/00
(52) U.S. Cl. .............................. 700/87; 700/18; 700/86; 710/5; 710/6; 710/7; 711/103; 365/221
(58) Field of Search .............................. 700/86, 87, 18; 365/221; 711/103; 710/5–7

(56) References Cited

U.S. PATENT DOCUMENTS

| | | | | |
|---|---|---|---|---|
| 4,641,251 A | * | 2/1987 | Inoue | 700/52 |
| 4,884,103 A | * | 11/1989 | Yamada | 399/77 |
| 5,507,001 A | * | 4/1996 | Nishizawa | 710/5 |
| 5,568,634 A | | 10/1996 | Gordons | 711/170 |
| 5,751,940 A | * | 5/1998 | Nicolai | 714/27 |

FOREIGN PATENT DOCUMENTS

| | | |
|---|---|---|
| DE | 2 72 177 | 9/1989 |
| DE | 42 22 043 | 7/1993 |
| DE | 198 07 382.8 | 9/1998 |

(List continued on next page.)

OTHER PUBLICATIONS

Innere Grösse entscheidet. In: mpa, 7/8–96, S.72; 68HC11—Controllerboard. In: Elektor 4/94, S. 14–17; insb.S.14, rechte Sp., Abs. 3,4 (original and translation attached).

Speicher–Subsystem, Decoder, SRAM und EPROM auf einem Chip. In: Design & Elektronik, Aug. 24 v. 22.11.1998, S. 6,7 (original and translation attached).

Wratil, Peter, "Speicherprogrammierbare Steuerungen in der Automatisierungstechnik," Vogel Buchverlag Würzburg, 1989, S. 48, 49, 76 (original and translation attached).

NEC Data Book, μCOM–75x Family 4–Bit CMOS Microcomputer DB75XFAM . . . 014V10, p. 3–0–265 (mentioned in Specification).

Texas Instruments Data Manual, TMS370 Family, 1994, SPNS014B, pp. 1–15 (mentioned in Specification).

*Primary Examiner*—Ramesh Patel
*Assistant Examiner*—Douglas M. Shute
(74) *Attorney, Agent, or Firm*—Kenyon & Kenyon

(57) ABSTRACT

The circuit configuration for storage management and for the execution of user programs in small control units using a microcontroller (2). A microcontroller (2) has a central processing unit, a volatile memory, a non-volatile memory and an interface. An additional non-volatile readable and writeable memory unit is configured as a serial memory unit and is,connected to the microcontroller as a separate unit via the interface. Different methods are described, for executing user programs using the circuit configuration. In a first method, the entire user program is read out from the separate memory and is serially interpreted by the microcontroller. In a second method, the entire user program is copied into and afterward directly interpreted by an internal memory of the microcontroller during the runup phase of the flow of control.

27 Claims, 2 Drawing Sheets

FOREIGN PATENT DOCUMENTS

| | | |
|---|---|---|
| DE | 197 23 441.0 | 12/1998 |
| DE | 197 24 744.6 | 1/1999 |
| DE | 197 30 949.6 | 1/1999 |
| DE | 197 31 170.9 | 1/1999 |
| DE | 197 35 522.6 | 1/1999 |
| DE | 197 27 986.4 | 2/1999 |
| DE | 197 32 324.3 | 2/1999 |
| DE | 197 33 720.1 | 2/1999 |
| DE | 197 35 521.8 | 2/1999 |
| DE | 197 38 401.3 | 3/1999 |
| DE | 197 38 807.8 | 3/1999 |
| DE | 197 43 468.1 | 4/1999 |
| DE | 197 44 827.5 | 4/1999 |
| DE | 197 46 564.1 | 4/1999 |
| DE | 197 46 566.8 | 4/1999 |
| DE | 197 46 809.8 | 4/1999 |
| DE | 197 46 813.6 | 4/1999 |
| DE | 197 46 815.2 | 4/1999 |
| DE | 197 48 288.0 | 5/1999 |
| DE | 197 48 632.0 | 5/1999 |
| DE | 197 48 633.9 | 5/1999 |
| DE | 299 03 328 U1 | 6/1999 |
| DE | 197 57 178.6 | 6/1999 |
| DE | 198 14 810.0 | 6/1999 |
| DE | 197 57 179.4 | 7/1999 |
| DE | 197 57 844.6 | 7/1999 |
| DE | 197 57 853.5 | 7/1999 |
| DE | 197 57 854.3 | 7/1999 |
| DE | 198 05 443.2 | 8/1999 |
| DE | 198 17 914.6 | 8/1999 |
| DE | 198 09 293.8 | 9/1999 |
| DE | 198 10 115.5 | 9/1999 |
| DE | 198 14 399.0 | 10/1999 |
| DE | 198 14 431.8 | 10/1999 |
| DE | 198 14 456.3 | 10/1999 |
| DE | 198 14 809.7 | 10/1999 |
| DE | 198 17 913.8 | 10/1999 |
| DE | 198 12 503.8 | 12/1999 |
| DE | 198 14 397.4 | 12/1999 |
| DE | 198 14 400.8 | 12/1999 |
| EP | 0 489 227 | 6/1992 |
| WO | WO 90 05339 | 5/1990 |

\* cited by examiner

CIRCUIT CONFIGURATION AND METHOD FOR STORAGE MANAGEMENT AND EXECUTION OF USER PROGRAMS IN A SMALL CONTROL UNIT

FIELD OF THE INVENTION

The present invention relates to a circuit configuration and method for storage management and for execution of user programs in a small control units species of related technology. Small control units are a new type of programmable controller. The wide field of programmable controllers is advantageously expanded by this type of control unit. The user of such a device is capable of implementing the smallest control tasks such as controlling window shutters, lighting systems or the like without having to use a large and expensive programmable controller.

The hardware of traditional programmable controllers is composed essentially of three main parts: a central unit, a memory unit and also peripherals and interface terminals. The central unit executes the corresponding user program by using logic operations, calculations, addressing, etc. The memory contains the user program to be executed and the operating system plus optionally other necessary data. The peripherals and the interfaces provide the central unit with additional operating means such as timer modules, counters and the like as well as connecting means to the outside world (standard interfaces and/or specific interfaces). The memory can be divided into different types according to function.

Code memory for storing the executable code of the operating system. This memory is usually designed as a non-volatile memory in the form of ROM, EPROM, flash or EEPROM and must be read as code by the central unit in the normal function.

Working memory for temporary storage of data during operation of the control unit. Therefore, this memory must be regarded as a read-write memory in the form of RAM.

User program memory for storing the user program. This memory must also be designed as a read-write memory. Furthermore, this memory must be designed as a non-volatile memory or at least as a volatile memory having a buffered power supply in the form of RAM.

For small control units, a microcontroller without the complicated peripherals required with traditional programmable controllers is often sufficient because of the limited variety of functions and the restricted memory space requirement associated with it.

Such circuit configurations are known from the related art in the form of standardized microcontrollers. A microcontroller having a central unit, a ROM unit, a RAM unit and an EEPROM unit is known from the NEC Data Book, μCOM-75x family 4-bit CMOS microcomputer DB75XFAM . . . 014V10, page 3-0-265 (see also FIG. 2). Another example of such a microcontroller is known from the Texas Instruments Data Manual, TMS370 family, 1994, SPNS014B, pages 1–15. This microcontroller has a central unit and a combined RAM/EEPROM unit by analogy with the microcontroller diagramed in FIG. 3.

FIG. 1 shows a schematic diagram of the general structure of a prior 2. Such a component consists essentially of a central unit 4 (CPU), an internal memory unit 6, port terminals 8 and also the standard internal peripherals and interface terminals. For the sake of simplicity, the additional standard peripherals and interface terminals are shown in one block as internal peripheral 10. For data exchange, the individual components are interconnected by internal lines 12 (directions of arrows correspond to directions of data flow).

There are a great many variants of microcontrollers in many different designs. Thus, for example, there are microcontrollers having a 4-bit, 8-bit, 16-bit or 32-bit central unit. Furthermore, the components differ greatly with regard to power consumption, speed and internal memory. They also differ greatly with regard to price, depending on the equipment and/or power of the microcontroller.

Since some microcontrollers already have an internal memory and peripherals, use of additional external resources depends on the performance and complexity of the control unit as well as the price and complexity of the microcontroller. In general, it can be assumed that there are suitable microcontrollers containing all the necessary necessary resources for small control units.

FIGS. 2 and 3 show diagrams of different microcontrollers 2 which might be suitable for use in small control units. These prior microcontrollers 2 already have all the resources integrated into them. Thus, microcontroller 2 shown in FIG. 2 has, in addition to central unit 4, a volatile read-write memory part 6a in the form of RAM for temporary storage of processing data, a non-volatile read memory part 6b designed as ROM for storing an interpreter and a non-volatile read-write memory part 6c designed as flash memory or EEPROM or battery-buffered RAM for storing the user program. In FIG. 2 the memory parts in the data area (RAM 6a and EEPROM 6c) and in the code area (ROM 6b) are separated from each other in such a way that the user program can be executed merely by using an interpreter. Microcontroller 2 shown in FIG. 3 is designed like microcontroller 2 shown in FIG. 2, with the difference being that here all memory parts 6a, 6b, 6c are combined in a common code and data area, so that a user program can be compiled (compiler) or interpreted (interpreter) as an alternative.

Such microcontrollers are technically quite suitable for use in small control units. The main disadvantage of such integrated circuit configurations is cost. The more functions implemented in an extremely tight space with integrated circuits, the more expensive is the corresponding chip. Furthermore, the selection of such standardized controllers on the market is greatly limited.

An object of the present invention is to create a sufficiently rapid and high-power circuit configuration for small control units that can be implemented inexpensively and in a small amount of space.

To achieve this object, a circuit configuration having the features of the characterizing part of Claim 1 and different methods according to Claims 4 or 7 are proposed. According to the present invention, the circuit configuration has a microcontroller which includes at least a central unit, a volatile memory in the form of RAM, a non-volatile memory (e.g., ROM) and an interface and has a non-volatile memory in the form of a separate memory unit. The separate memory unit is designed as a serial memory unit, which has the advantage that it is much smaller and less expensive than a parallel memory unit. Any disadvantage with respect to speed is not noticeable in any field of application of such control units when using the method according to the present invention.

In a first method, the external memory unit communicates with the microcontroller over an interrupt-controlled serial interface thereof, and the user program in the external serial memory unit is executed by the central unit and an interpreter in the non-volatile memory of the microcontroller.

In a second method, the external memory unit communicates with the microcontroller either over a serial interface (need not necessarily be interrupt controlled here) or directly over the port pins of the microcontroller. In this method, the central unit copies the total contents of the separate memory unit (the total user program plus the required data) to the internal volatile memory of the microcontroller. Then the central unit interprets the user program exclusively from the internal volatile memory of the microcontroller. This method thus permits a very high processing speed. It is thus possible to implement to advantage an inexpensive circuit configuration which nevertheless meets the requirements that occur with a small control unit with regard to processing speed, functionality and memory space required for the user programs. Such circuit configurations, which are accommodated completely in a microcontroller, are currently approximately twice as expensive.

BRIEF DESCRIPTION OF THE DRAWINGS

Additional advantages and possible embodiments of the present invention are described below with reference to the drawings in which in the subordinate claims and in the description of the figures, which show:

DETAILED DESCRIPTION

Figure 1:
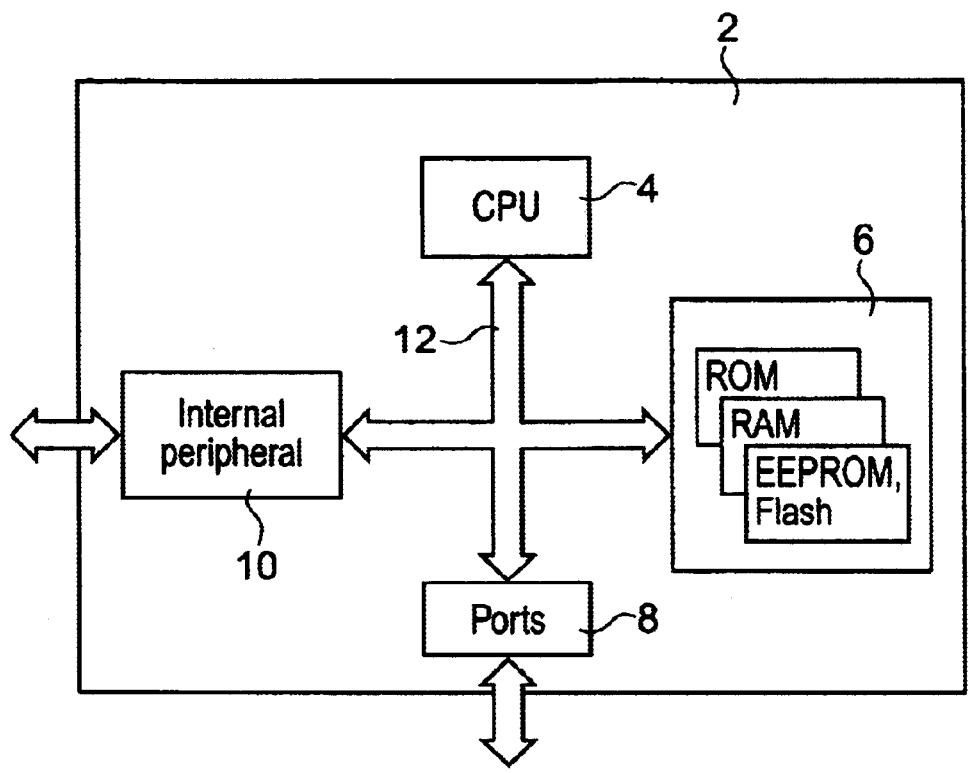
FIG. 1 shows a schematic diagram depicting the general structure of a prior art microcontroller.
Figure 2:
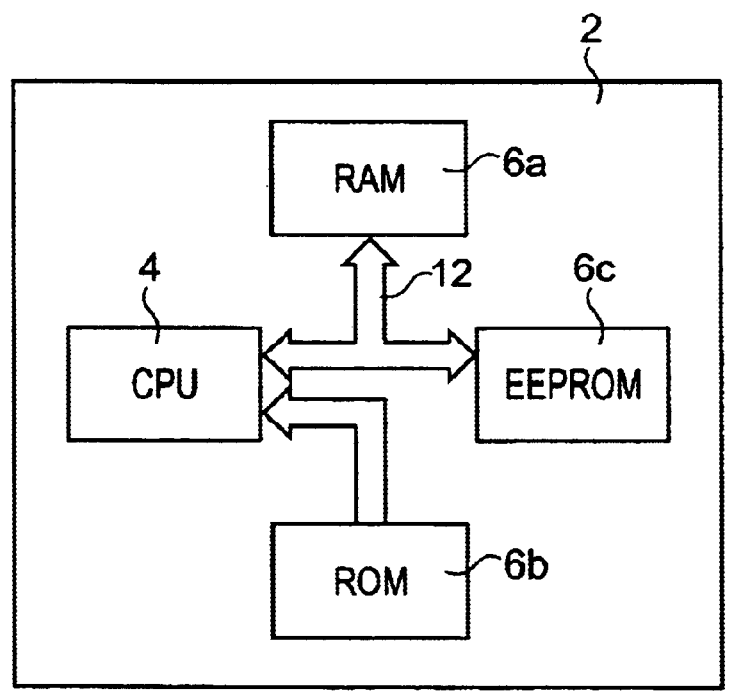
FIG. 2 shows a schematic diagram of a first prior art microcontroller.
Figure 3:
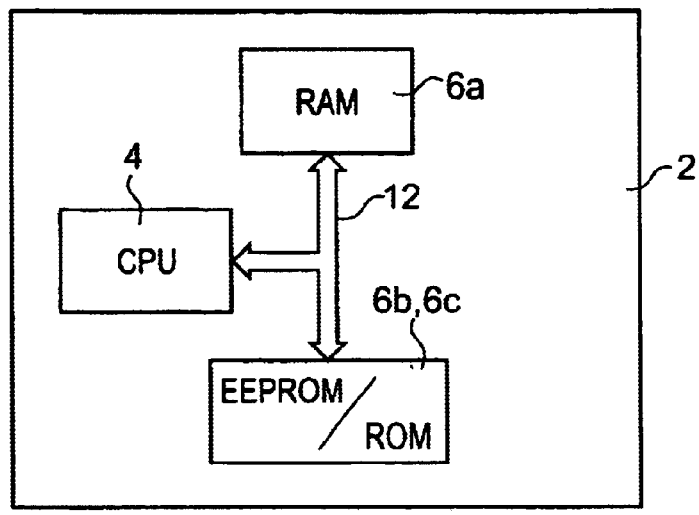
FIG. 3 shows a schematic diagram of a second prior art microcontroller.
Figure 4:
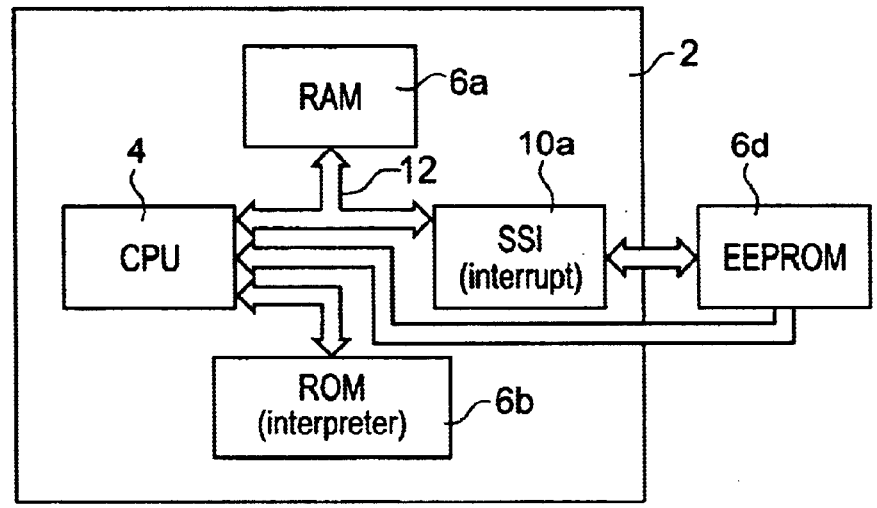
FIG. 4 shows a schematic diagram of a first possible embodiment of the circuit configuration according to the present invention.

FIG. 4 shows a first possible embodiment of the circuit configuration according to the present invention, using a microcontroller 2, with central unit 4, shows volatile read-write memory 6a, non-volatile read memory 6b and a synchronous serial interface 10a being parts of microcontroller 2, and non-volatile read-write memory unit 6d being a serial memory unit connected as a separate unit to microcontroller 2 over an interface. Since microcontrollers 2 to be used are usually standard controllers, other standard peripherals are of course integrated into such microcontrollers. According to the present invention, a microcontroller 2 without non-volatile read-write memory is used (in particular for storing the user program) and the memory is replaced by a separate non-volatile read-write memory unit 6d.

In the embodiment illustrated in FIG. 4, the interface of microcontroller 2 is designed as a serial interrupt-controlled interface 10a. Program processing using this circuit configuration is described below:

First, the user program to be executed must be loaded into separate memory unit 6d. This is done, for example, by direct programming using a keyboard of the small control unit or by copying the user program from another device (e.g., a PC) over a special interface of the small control unit. Then the bit sequence of the first command is loaded from memory unit 6d into central unit 4 of microcontroller 2, decoded and executed (interpreted) by it, and at the same time the sequence command from memory unit 6d is transferred to central unit 4. An interrupt is generated by interface 10a for this purpose after each 8-bit instruction and after each complete command (which may also consist of several bytes) and transferred to central unit 4, so that input of the respective sequence commands is guaranteed by the control unit. Central unit 4 uses an interpreter stored in ROM 6b to execute the user program. In a preferred embodiment of the present invention, each command of the user program is implemented with a maximum of two bytes. Execution of commands using a compiler usually requires four to six bytes per command to be executed. Having commands executed using an interpreter according to the present invention yields memory savings of approximately 50%. Even extremely small and thus inexpensive microcontrollers with a RAM range of approximately 256–512 bytes for the user program can thus also be used to advantage. To guarantee rapid and smooth processing of the user program, the transfer time per command of interface 10a is preferably less than or equal to the execution time of microcontroller 2 composed of processing time per command and interrupt time. With interrupt-controlled processing of the user program, interface 10a transfer times much longer than the execution time of microcontroller 2 are technically feasible but not desirable.

Figure 5:
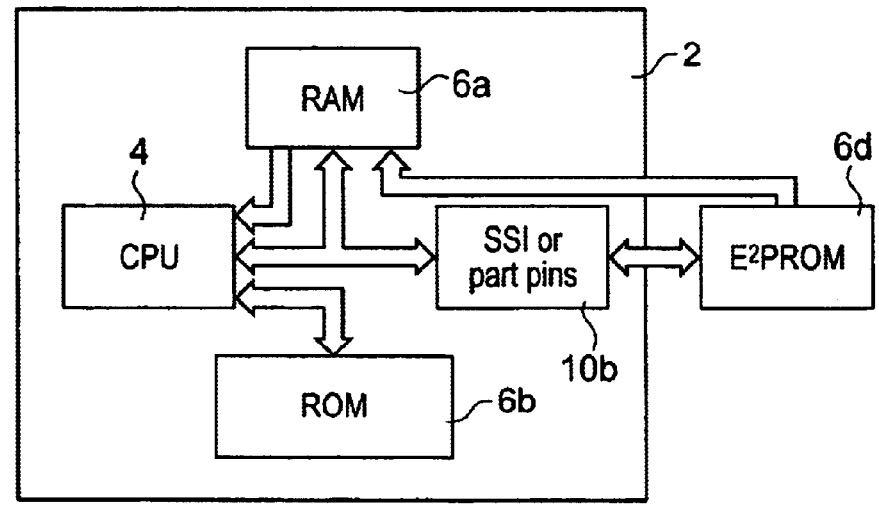
FIG. 5 shows a schematic diagram of a second possible embodiment of the circuit configuration according to the present invention.

FIG. 5 shows a second preferred embodiment of the circuit configuration according to the present invention. Communication or data exchange between microcontroller 2 and separate memory unit 6d takes place here over interface 10b a serial interface or a port pin interface. With regard to its structure, microcontroller 2 is essentially equivalent to microcontroller 2 shown in FIG. 4 and described above, but an interrupt-capable interface, as shown in FIG. 4, is not necessary. The type and manner of program processing in this embodiment differs greatly from that described above. Each time the small control unit is turned on, the total contents, in particular the user program, of separate memory unit 6d is copied to volatile memory 6a (RAM here) of microcontroller 2 during the power-up phase. Then central unit 4 interprets the user program with the help of the interpreter in the integrated non-volatile read memory 6b. Since the relatively time-consuming copying of the user program during the power-up phase of the control unit is not relevant, a relatively slow separate memory module such as an IIC EEPROM (EEPROM for an IIC interface) can also be used. The IIC EEPROM offers the advantage of a line-saving dual-core connection in comparison with other serial memory modules. In addition, serial EEPROM modules are considerably smaller and less expensive in comparison with parallel EEPROM modules. When using an even simpler microcontroller 2 (without a specific serial interface 10a), the user program can also be transferred directly from separate memory unit 6d to RAM 6a of microcontroller 2 over port pins in a software-controlled process. The advantage with this method, which is also very inexpensive, is that it has especially good immunity to interference. The data to be transferred can be filtered reliably because of the lower transfer rate, and all data blocks can be provided with a global checksum with practically no loss of time or memory.

The present invention is not limited to the embodiments described here, but instead it also includes all other embodiments within the scope of the attached claims.

What is claimed is:

1. A circuit configuration for storage management and for executing a user program in a small control unit, the circuit configuration comprising:

a central unit for processing data;

a volatile memory for temporary storage of data;

a non-volatile memory for permanent storage of an operating system;

a serial interface for external communication; and a non-volatile read-write memory unit for storing the user program;

the central unit, the volatile memory, the non-volatile memory and the serial interface being included in a microcontroller, the non-volatile read-write memory unit being a serial memory unit and being a separate unit connected to the microcontroller via the serial interface.

2. The circuit configuration as recited in claim 1 wherein the small control unit has reduced functions and memory capacity relative to traditional programmable controllers.

3. The circuit configuration as recited in claim 1 wherein the volatile memory includes a RAM.

4. The circuit configuration as recited in claim 1 wherein the non-volatile memory includes at least one of a ROM and an EPROM.

5. The circuit configuration as recited in claim 1 wherein the non-volatile read-write memory unit includes an EEPROM.

6. The circuit configuration as recited in claim 1 wherein the serial interface is a serial imterrupt-controlled interface.

7. The circuit configuration as recited in claim 6 wherein a transfer time per command of the serial interface is not substantially greater than an execution time of the microcontroller, the execution time of the microcontroller including a processing time per command and an interrupt time per command.

8. The circuit configuration as recited in claim 7 wherein the transfer time per command of the serial interface is smaller than the execution time of the microcontroller.

9. A method of executing a user program using a circuit configuration for storage management and executing a user program in a small control unit, the small control unit including a central unit for processing data, a volatile memory for temporary storage of data, a non-volatile memory for permanent storage of an operating system, a non-volatile read-write memory unit for storage of the user program, and a serial interrupt-controlled interface for external communication, the central unit, the volatile memory, the non-volatile memory and the serial interrupt-controlled interface being included in a microcontroller, the non-volatile read-write memory unit being a serial memory unit and being a separate unit connected to the microcontroller via the serial interrupt-controlled interface, the method comprising:

entering a bit sequence of a first command from the memory unit into the central unit;

interpreting the first command using the central unit and at the same time entering a first sequence command from the memory unit into the central unit via the serial interrupt-controlled interface; and generating an interrupt after each concluded input of a fixed bit length and after each concluded command.

10. The method as recited in claim 9 further comprising:

interpreting at least one second command using the central unit and at the same time entering at least one respective sequence command from the memory unit into the central unit via the serial interrupt-controlled interface so as to execute the user program.

11. The method as recited in claim 9 wherein the small control unit has reduced functions and memory capacity relative to traditional programmable controllers.

12. The method as recited in claim 9 wherein the volatile memory includes a RAM.

13. The method as recited in claim 9 wherein the non-volatile memory includes at least one of a ROM and an EPROM.

14. The method as recited in claim 9 wherein the non-volatile read-write memory unit includes an EEPROM.

15. The method as recited in claim 9 wherein a transfer time per command of the interface is not substantially greater than an execution time of the microcontroller, the execution time of the microcontroller including a processing time per command and an interrupt time per command.

16. The circuit configuration as recited in claim 15 wherein the transfer time per command of the interface is smaller than the execution time of the microcontroller.

17. A method of executing a user program using a circuit configuration for storage management and executing a user program in a small control unit, the small control unit including a central unit for processing data, a volatile memory for temporary storage of data, a non-volatile memory for permanent storage of an operating system, a non-volatile read-write memory unit for storage of the user program, and a serial interface for external communication, the central unit, the volatile memory, the non-volatile memory and the serial interface being included in a microcontroller, the nonvolatile read-write memory unit being a serial memory unit and being a separate unit connected to the microcontroller via the serial interface, the method comprising:

copying the user program from the non-volatile read-write memory unit into the volatile memory during a power-up phase of the control unit; and interpreting the user program directly from the volatile memory using the central unit.

18. The method as recited in claim 17 wherein the small control unit has reduced functions and memory capacity relative to traditional programmable controllers.

19. The method as recited in claim 17 wherein the volatile memory includes a RAM.

20. The method as recited in claim 17 wherein the non-volatile memory includes at least one of a ROM and an EPROM.

21. The method as recited in claim 17 wherein the non-volatile read-write memory unit is a serial memory unit and includes an EEPROM.

22. A method of executing a user program using a circuit configuration for storage management and executing a user program in a small control unit, the small control unit including a central unit for processing data, a volatile memory for temporary storage of data, a non-volatile memory for permanent storage of an operating system, a non-volatile read-write memory unit for storage of the user program and a port pin interface for external communication, the central unit, the volatile memory, the non-volatile memory and the port pin interface being included in a microcontroller, the non-volatile read-write memory unit being a serial memory unit and being a separate unit connected to the microcontroller via the port pin interface, the microcontroller communicating with the non-volatile read-write memory unit via the port pin interface in a software-controlled operation, the method comprising:

copying the user program from the non-volatile read-write memory unit into the volatile memory during a power-up phase of the control unit; and interpreting the user program directly from the volatile memory using the central unit.

23. The method as recited in claim 22 wherein the small control unit has reduced functions and memory capacity relative to traditional programmable controllers.

24. The method as recited in claim 22 wherein the volatile memory includes a RAM.

25. The method as recited in claim 22 wherein the non-volatile memory includes at least one of a ROM and an EPROM.

26. The method as recited in claim 22 wherein the non-volatile read-write memory unit includes an EEPROM.

27. A circuit configuration comprising:
- a central unit configured to process data;
- a volatile memory configured to temporarily store data;
- a non-volatile memory including an operating system stored therein;
- one of a serial interface and a port pin interface for external communication; and
- a serial non-volatile read-write memory unit;
- the central unit, the volatile memory, the non-volatile memory and the serial interface being included in a microcontroller, the microcontroller not including a dedicated memory unit for the user program but having as a separate unit connected to it, via one of the serial interface and the port pin interface, the non-volatile read-write memory unit for storing the user program.

* * * * *

UNITED STATES PATENT AND TRADEMARK OFFICE
CERTIFICATE OF CORRECTION

PATENT NO.    : 6,697,686 B1
DATED         : February 24, 2004
INVENTOR(S)   : Horea-Stefan Culca et al.

It is certified that error appears in the above-identified patent and that said Letters Patent is hereby corrected as shown below:

<u>Title page,</u>
Item [57], ABSTRACT,
Line 1, change "The circuit" to -- A circuit --
Line 3, change "(2). A microcontroller" to -- The microcontroller --
Line 3, change delete "(2)"

<u>Column 1,</u>
Line 10, change "in a small control units species of related technology. Small control units..." to -- in small control units. RELATED TECHNOLOGY small control units... --
Line 62, change "of a prior 2." to -- of a prior microcontroller 2. --

<u>Column 2,</u>
Line 19, change "the resources" to -- the necessary resources --
Lines 42-43, insert -- SUMMARY OF THE INVENTION --

<u>Column 3,</u>
Line 20, change "drawings in which" to -- drawings, in which: --
Lines 20-21, delete "in the subordinate claims and in the description of the Figures, which show:"

<u>Column 4,</u>
Line 26, change "10b a serial" to -- 10b which may be either a serial --

Signed and Sealed this

Fourth Day of January, 2005

JON W. DUDAS
*Director of the United States Patent and Trademark Office*